United States Patent
Tao et al.

(10) Patent No.: US 8,654,845 B2
(45) Date of Patent: Feb. 18, 2014

(54) METHOD AND DEVICE FOR VIDEO PREDICTIVE ENCODING

(75) Inventors: Pin Tao, Shenzhen (CN); Wenting Wu, Shenzhen (CN); Mou Xiao, Shenzhen (CN); Jiangtao Wen, Shenzhen (CN); Chenchen Gu, Shenzhen (CN); Jing Lv, Shenzhen (CN); Fuzhong Sheng, Shenzhen (CN)

(73) Assignees: Tencent Technology (Shenzhen) Company Limited, Shenzhen (CN); Tsinghua University, Beijing (CN)

(*) Notice: Subject to any disclaimer, the term of this patent is extended or adjusted under 35 U.S.C. 154(b) by 0 days.

(21) Appl. No.: 13/608,064

(22) Filed: Sep. 10, 2012

(65) Prior Publication Data

US 2013/0051468 A1 Feb. 28, 2013

Related U.S. Application Data

(63) Continuation of application No. PCT/CN2011/071611, filed on Mar. 8, 2011.

(30) Foreign Application Priority Data

Mar. 12, 2010 (CN) .......................... 2010 1 0123950

(51) Int. Cl.
*H04N 7/12* (2006.01)

(52) U.S. Cl.
USPC ..................................................... 375/240.13

(58) Field of Classification Search
USPC ............. 375/240.02–240.05, 240.13, 240.15
IPC ........................................................ H04N 7/12
See application file for complete search history.

(56) References Cited

U.S. PATENT DOCUMENTS

| 6,920,175 | B2 | 7/2005 | Karczewicz et al. |
| 2007/0206872 | A1 | 9/2007 | Song |
| 2008/0198931 | A1 | 8/2008 | Chappalli et al. |
| 2010/0158103 | A1* | 6/2010 | Ye et al. .................. 375/240.02 |
| 2010/0226437 | A1* | 9/2010 | Robertson et al. ....... 375/240.16 |
| 2012/0033736 | A1* | 2/2012 | Sato ......................... 375/240.16 |
| 2012/0183041 | A1* | 7/2012 | Maani ...................... 375/240.02 |

FOREIGN PATENT DOCUMENTS

| CN | 1929611 A | 3/2007 |
| CN | 1929612 A | 3/2007 |
| CN | 101783957 A | 7/2010 |
| EP | 1761063 A2 | 3/2007 |
| EP | 1761064 A2 | 3/2007 |
| KR | 100626419 B1 | 9/2006 |
| WO | WO-2006/003499 A1 | 1/2006 |

OTHER PUBLICATIONS

International Preliminary Report on Patentability, International Application No. PCT/CN2011/071611, issuance date Sep. 18, 2012.
International Search Report, International Application No. PCT/CN2011/071611, mailing date Jun. 16, 2011.
Written Opinion, Intellectual Property Office of Singapore, Singapore Patent Application No. 20126531-4, dated Feb. 22, 2013.
Written Opinion, International Application No. PCT/CN2011/071611, completion date May 30, 2011.

* cited by examiner

*Primary Examiner* — Tung Vo
(74) *Attorney, Agent, or Firm* — Marshall, Gerstein & Borun LLP

(57) ABSTRACT

The invention provides a method and device for video predictive encoding.

15 Claims, 8 Drawing Sheets

METHOD AND DEVICE FOR VIDEO
PREDICTIVE ENCODING

CROSS-REFERENCE TO RELATED APPLICATIONS

This is a continuation of International Patent Application No. PCT/CN2011/071611 filed Mar. 8, 2011, which in turn claims the priority benefit of Chinese Patent Application No. CN 201010123950.5 filed Mar. 12, 2010, the entire respective disclosures of which are incorporated herein by reference.

TECHNICAL FIELD

The invention relates to video processing technologies, and more particularly, to a method and device for video predictive encoding.

BACKGROUND OF THE INVENTION

At present, network applications gradually develop towards multimedia services. As an important component of multimedia service, video has become one of main carriers about information transmission. New requirements for video quality have been put forward by wide application of video. Resolution of each kind of video at present becomes larger. Meanwhile, growth rate of video data size exceeds development rate of storage device and network bandwidth. Thus, long-term and widespread attention has been paid to video compressing and encoding technologies.

In existed video compression and encoding technologies, video is generally divided into I frame, P frame and B frame to be respectively encoded. I frame is an intra-frame encoding frame, which may only be predicted with intra-frame information during encoding process. In a decoding process, I frame image may be decoded and reconstructed with code stream of current frame. Encoding and decoding processes of I frame are independent, which are not relevant with adjacent frames, e.g., front and rear frames. In the encoding processes about P frame and B frame, in addition to adopting intra-frame prediction technologies, inter-frame prediction may also be executed. In the inter-frame prediction technologies, it is necessary to search in a reference frame for a block most similar to current Macro Block (MB), to be predicted. While, in the decoding process, a prediction block may be found from the decoded reference frame, according to motion vector information, so as to implement decode. The encoding and decoding processes about P frame and B frame are not independent, which have high time complexity, utilize inter-frame time correlation and intra-frame space correlation, so as to implement efficient compression. Compared with the encoding process of P frame and B frame, I frame may only utilize the intra-frame space correlation to execute prediction, the encoding process thereof is independent and has lower complexity. However, compression efficiency of I frame is far from that of P frame and B frame.

At present, the intra-frame prediction is mainly applied in the encoding process about I frame. However, in the P frame or B frame, when it is difficult to search out accurate prediction block with inter-frame motion search technologies, the intra-frame prediction may also be adopted by few MBs.

At present, in Moving Picture Exports Group-2 (MPEG-2) standards, a simple airspace prediction algorithm may be adopted by the intra-frame prediction. Each pixel in an encoding block may use pixel value 128 to execute prediction, instead of utilizing information of the encoding frame to execute the prediction. For most of the sequences, prediction residual of the method is larger. Thus, compression efficiency of I frame which adopts such intra-frame prediction method is lower. In MPEG-4 standards, an intra-frame encoding block adopts Direct Current (DC)/Alternating Current (AC) prediction algorithm of frequency domain. Firstly, the encoding block executes a Discrete Cosine Transform (DCT) to the frequency domain, performs prediction on coefficient of current block utilizing DC/AC coefficient of an adjacent block. By using the MPEG-4 method, compression efficiency of I frame is improved. In H.264/Advanced Video Coding (AVC), an intra-frame prediction algorithm of direction prediction is adopted. Regarding each pixel block of 16*16, 8*8, or 4*4, the algorithm may execute the prediction from a certain direction by utilizing upper, left, upper left, upper right encoded blocks thereof. The compression efficiency of I frame may be greatly improved by using the direction prediction technologies. However, in the prediction process in which block is taken as a prediction unit, only correlation of pixels among blocks is utilized. However, correlation between adjacent pixels within a block is not fully utilized. For an entire block, it is difficult to accurately predict a pixel far from a prediction pixel within a block. Thus, prediction residual within a frame is larger. Particularly to a block with complicated texture information, it is difficult to achieve good prediction, which directly leads to lower compression efficiency of intra-frame encoding. Subsequently, compression efficiency of whole video sequence may be affected.

However, for video images with same contents, correlation between pixels is larger accompanying with higher resolution. However, such space correlation is not fully utilized in existed intra-frame encoding technologies. To address this shortcoming, it is of great significance to study a prediction algorithm which fully utilizes correlation among pixels, so as to improve compression efficiency of video encoding.

SUMMARY OF THE INVENTION

An embodiment of the present invention provides a method for video predicting encoding, so as to improve compression efficiency of video encoding.

An embodiment of the present invention provides a device for video predictive encoding, so as to improve compression efficiency of video encoding.

The technical schemes provided by embodiments of the invention are as follows.

A method for video predictive encoding, including:

extracting a pixel block from current frame, dividing the pixel block into a principal set of pixels and a complementary set of pixels;

encoding the principal set of pixels, outputting code stream of the principal set of pixels, obtaining a reconstruction value of the principal set of pixels;

interpolating to reconstructed pixel values, which include the reconstruction value of the principal set of pixels, take a result as predictive value of the complementary set of pixels, executing an intra-frame predictive encoding for the complementary set of pixels, outputting code stream of the complementary set of pixels, obtaining a reconstruction value of the complementary set of pixels; and combining the reconstruction value of the principal set of pixels and the reconstruction value of the complementary set of pixels, and obtaining a reconstruction value of the pixel block.

A device for video predictive encoding, wherein the device includes a pixel dividing unit, a unit for encoding a principal set of pixels, a unit for encoding a complementary set of pixels, and a unit for combining reconstruction value of pixel block;

the pixel dividing unit is to extract a pixel block from current frame, divide the pixel block into a principal set of pixels and a complementary set of pixels;

the unit for encoding a principal set of pixels is to encode the principal set of pixels, output code stream of the principal set of pixels, and obtain a reconstruction value of the principal set of pixels;

the unit for encoding a complementary set of pixels is to interpolate to reconstructed pixel values, which include the reconstruction value of the principal set of pixels, take a result as predictive value of the complementary set of pixels, execute an intra-frame predictive encoding for the complementary set of pixels, output code stream of the complementary set of pixels, and obtain a reconstruction value of the complementary set of pixels; and the unit for combining reconstruction value of pixel block is to, combine the reconstruction value of the principal set of pixels and the reconstruction value of the complementary set of pixels, and obtain a reconstruction value of the pixel block.

From the above technical schemes, it can be seen that in the implementation modes of the invention, firstly extract a pixel block from current frame and divide the pixel block into a principal set of pixels and a complementary set of pixels. And then, encode the principal set of pixels, output code stream of the principal set of pixels and obtain reconstruction value of the principal set of pixels. Interpolate to reconstructed pixel values including the reconstruction value of the principal set of pixels, utilize the result as predictive value of the complementary set of pixels, execute intra-frame predictive encoding for the complementary set of pixels, output code stream of the complementary set of pixels, and obtain reconstruction value of the complementary set of pixels. Finally, combine the reconstruction value of the principal set of pixels and the reconstruction value of the complementary set of pixels, to obtain reconstruction value of the pixel block. Thus, it can be seen that correlation among intra-frame pixels is fully utilized in the implementation modes of the invention. Subsequently, prediction accuracy may be improved, and prediction residual may be reduced. Thus, code stream overhead of residual may be directly reduced, and compression efficiency may be improved.

Implementation modes of the invention may be applied to the encoding of I frame about H.264/AVC. An even MB and an odd MB may be obtained after sampling and dividing horizontally with every other column, so as to reduce code stream overhead of flag information in intra-frame predictive encoding mode. Subsequently, the compression efficiency may be further improved. For an odd MB, the code stream overhead of flag information about prediction mode may be saved with a fixed prediction mode. For an even MB, greater savings regarding code stream overhead of flag information about intra-frame prediction mode may be obtained, by adopting a prediction encoding method of an improved intra-frame prediction mode.

Furthermore, implementation complexity of implementation mode in the invention is lower. When executing prediction encoding for an odd MB utilizing a reconstructed pixel block of an encoded even MB, only a 19l6 pixel is employed in calculation of a 6-tap interpolation filter, in which 16l6 pixel comes from pixels belonging to an even MB in current 32*16 block, 3l6 pixel comes from a left reconstructed neighbor MB. It is not necessary to buffer MBs of other lines in the encoding process. Thus, memory occupation is greatly saved, and cache hit rate is improved. Especially for a high-definition video source with huge data amount, the technical scheme with low memory occupation is easily implemented with chip. Besides, the implementation mode of the invention is very suitable for highly parallel calculation. Thus, rapid compression encoding for a high-definition video source may be implemented.

EMBODIMENTS OF THE INVENTION

To make objectives, technical solutions and advantages of the invention more clear, detailed descriptions about implementation modes of the invention are further provided in the following accompanying with attached figures.

Regarding the deficiencies in the prior art, that is, intra-frame fixed space association is not fully utilized in intra-frame encoding technologies. An implementation mode of the invention provides a method for video predictive encoding based on adjacent pixel association, so as to achieve the objectives of overcoming above deficiencies and improving encoding efficiency.

Figure 1:
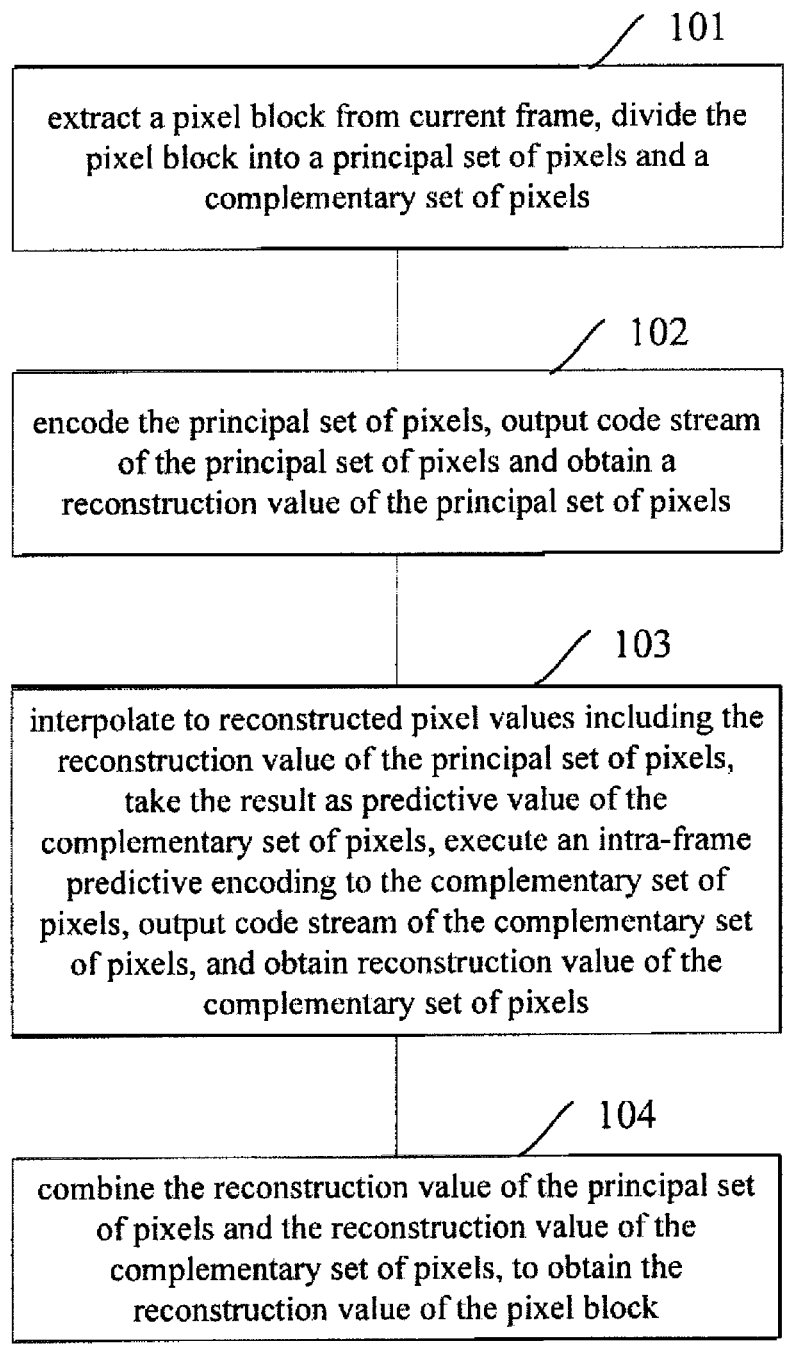
FIG. 1 is a flowchart illustrating a method for video predictive encoding, in accordance with an embodiment of the invention.

FIG. 1 is a flowchart illustrating a method for video predictive encoding, in accordance with an embodiment of the invention.

As shown in FIG. 1, the method includes the follows.

Block 101: extract a pixel block from current frame, and divide the pixel block into a principal set of pixels and a complementary set of pixels.

For example, an M*N pixel block, which is referred to as an original block, may be extracted from current encoding frame. M is width of the pixel block, and N is height of the pixel block. The M*N pixel block may be a luminance block or a chrominance block, which is not limited in the implementation modes of the invention. And then, sample some pixels of the M*N pixel block (suppose number of these pixels is P) according to a certain sampling rule. The sampled pixels may be referred to as the principal set of pixels. The remaining pixels are the complementary set of pixels. That is, sample P pixels from the original M*N block to form the principal set of pixels. The remaining pixels may form the complementary set of pixels. Here, M should be smaller than or equal to frame width of current frame. N should be smaller than or equal to frame height of current frame, and P<M*N (that is, size of the principal set of pixels must be smaller than that of the original block).

More specifically, the pixel block may be divided into the principal set of pixels and the complementary set of pixels, according to a sampling mode of every other row and every other column or a board sampling mode (still or a class board sampling mode).

Detailed descriptions about sampling modes are provided in the following.

In the sampling mode of every other row and every other column, different sampling modes may be employed, according to row sampling period (recorded as Tr, Tr is a non-zero integer, Tr≤N), column sampling period (recorded as Tc, Tc is a non-zero integer, Tc≤M, Tr·Tc≠1), row number about the first row of the principal set of pixels in the pixel block (recorded as r, r=1, ..., Tr), and column number about the first column of the principal set of pixels in the pixel block (recorded as c, c=1, ..., Tc).

Figure 2:
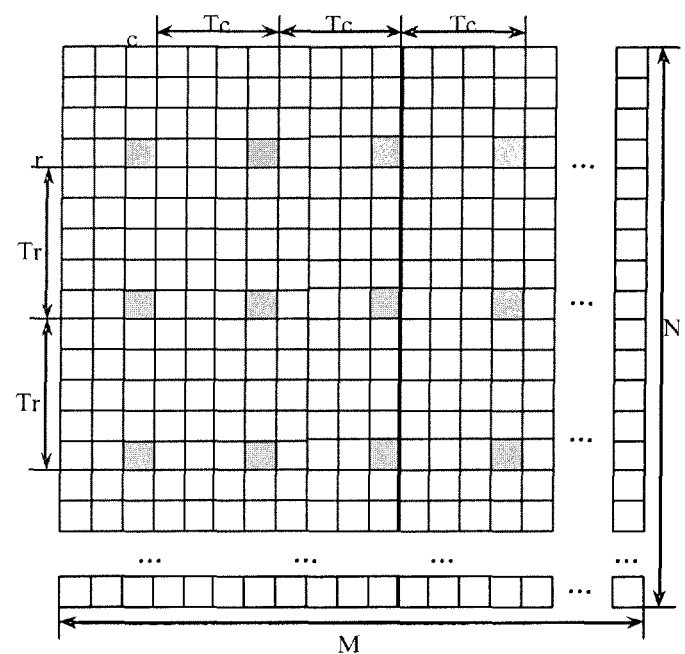
FIG. 2 is a schematic diagram illustrating a sampling mode of every other row and every other column, in accordance with an embodiment of the invention.

FIG. 2 is a schematic diagram illustrating a sampling mode of every other row and every other column, in accordance with an embodiment of the invention, in which parameters c=3, r=4, Tc=4, Tr=5. Pixels represented by gray boxes form the principal set of pixels. When arranging the principal set of pixels to form an m*n block, according to an initial location sequence, that is, width of the principal set of pixels is m, height of the principal set of pixels is n, and then relationship between m, n and M, N is shown in formula (1).

$$m = \left\lfloor \frac{M-c}{Tc} \right\rfloor + 1, n = \left\lfloor \frac{N-r}{Tr} \right\rfloor + 1 \qquad \text{formula (1)}$$

The function ⌊ ⌋ indicates to round towards nearest integer which is smaller than it.

Figure 3:
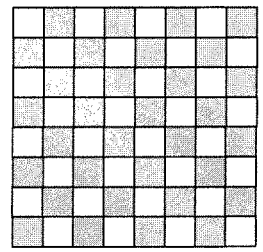
FIG. 3 is a schematic diagram illustrating a board sampling, in accordance with an embodiment of the invention.
Figure 4:
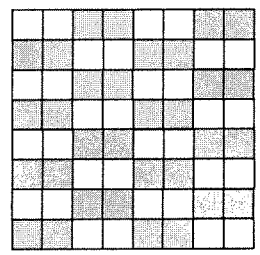
FIG. 4 is a schematic diagram illustrating a class board sampling, in which sampling unit is a 2*1 pixel block, in accordance with an embodiment of the invention.

(Class) board sampling includes board sampling and various sampling methods, derived from the board sampling. In the board sampling, adjacent pixels of each sampled pixel, including up, down, left, right pixels thereof, are not sampled. When the sampled unit is a pixel block of fixed size, instead of a pixel point, however, the board sampling rule is still employed, and then such sampling is referred to as class board sampling. FIG. 3 is a schematic diagram illustrating a board sampling, in accordance with an embodiment of the invention. FIG. 4 is a schematic diagram illustrating a class board sampling, in which sampling unit is a 2*1 pixel block, in accordance with an embodiment of the invention. As shown in FIG. 3, pixels represented by gray boxes (or white boxes) may be sampled to form the principal set of pixels.

It should be noted that, size of principal set of pixels may be different accompanying with different sampling modes. The principal set of pixels may form an encoding block, according to encoding requirements. The complementary set of pixels is formed by the remaining pixels in the original block, except for the principal set of pixels. Thus, size of the complementary set of pixels may be same as or different from that of the principal set of pixels. Shape and number of encoding block formed by the complementary set of pixels may be not consistent with that formed by the principal set of pixels.

Block 102: encode the principal set of pixels, output code stream of the principal set of pixels, and obtain a reconstruction value of the principal set of pixels.

Here, prediction method about the principal set of pixels may be different accompanying with different types of current frame. When current frame is I frame, the principal set of pixels may execute prediction with algorithms, such as H.264/AVC direction prediction algorithm. When current frame is P frame or B frame, the principal set of pixels may execute prediction with an algorithm similar to H.264/AVC direction prediction algorithm, or with inter-frame motion search technologies.

Specifically, firstly determine type of current frame, when type of current frame is I frame, employ an algorithm similar to the H.264/AVC direction prediction algorithm, to encode the principal set of pixels. When type of current frame is P frame or B frame, employ an algorithm similar to the H.264/AVC direction prediction algorithm or inter-frame motion search technologies to encode the principal set of pixels.

More specifically, H.264/AVC is a video encoding standard with the highest compression efficiency at present. In the H.264/AVC, the direction prediction technologies are employed by an intra-frame encoding block to execute the intra-frame prediction. For blocks with different sizes, the direction prediction employs different prediction modes. For a luminance component, block size may be 16*16 or 4*4. There may be 4 kinds of prediction modes for the 16*16 luminance block (type of corresponding MB is I16 MB). There may be 9 kinds of prediction modes for the 4*4 luminance block (type of corresponding MB is I4 MB). For a chrominance component, block size is 8*8, and there may be 4 kinds of prediction modes. There may be 4 kinds of prediction modes for the 16*16 luminance block (or 8*8 chrominance block), which are respectively horizontal prediction, vertical prediction, DC prediction and planar prediction. In the horizontal prediction, predictive value of each pixel in one row is equal. The predictive value is a border pixel value of a left adjacent reconstructed block in the row. In the vertical prediction, predictive value of each pixel in one column is equal. The predictive value is a border pixel value of an up adjacent reconstructed block in the column. In the DC prediction, the whole block adopts the same predictive value. The predictive value may be obtained by averaging 16 (or 8) border pixels of an up adjacent reconstructed block of the block, 16 (or 8) border pixels of a left adjacent reconstructed block of the block, and upper-left-corner adjacent pixels. When some pixels of these pixels don't exist (current MB is located in upper border or left border of the image), the predictive value may be obtained by averaging existed pixels. In the planar prediction, prediction for each pixel in current block may be executed with a linear function, by using border pixels of left adjacent and up adjacent reconstructed blocks of current block. When executing direction prediction for a 4*4 luminance block, there may be 9 kinds of prediction modes correspondingly, which are respectively vertical prediction (mode number 0), horizontal prediction (mode number 1), diagonal left down prediction (mode number 3), diagonal right down prediction (mode number 4), vertical right prediction (mode number 5), horizontal down prediction (mode number 6), vertical left prediction (mode number 7), horizontal left prediction (mode number 8), and DC prediction (mode number 2). Each prediction mode may utilize reconstructed pixels in a direction corresponding to the mode, to execute prediction for pixels in current block.

Block 103: interpolate to reconstructed pixel values including the reconstruction value of the principal set of pixels, obtain predictive value of the complementary set of pixels, execute an intra-frame predictive encoding for the complementary set of pixels, output code stream of the complementary set of pixels, and obtain reconstruction value of the complementary set of pixels.

The reconstructed pixel values here may be reconstruction value of the principal set of pixels, which may also include the reconstruction value of the principal set of pixels and reconstruction value of other pixel block except for current pixel block. For example, when currently encoded pixel block is the first pixel block executing the encoding, there is no reconstruction value about other pixel block except for current pixel block. At this time, the reconstructed pixel values may only include the reconstruction value about the principal set of pixels. Subsequently, the predictive value of the complementary set of pixels may be obtained after interpolating to the reconstruction value of the principal set of pixels. And then, execute the intra-frame predictive encoding for the complementary set of pixels, output the code stream of the complementary set of pixels, and obtain the reconstruction value of the complementary set of pixels. When there are reconstructed pixel values of other pixel block, interpolate to all the reconstructed pixel values, which include the reconstruction value of the principal set of pixels and reconstructed pixel values of other pixel block, to obtain the predictive value of the complementary set of pixels. And then, execute the intra-frame predictive encoding, output the code stream of the complementary set of pixels, and obtain the reconstruction value of the complementary set of pixels.

Preferably, each pixel in the complementary set of pixels may be categorized, according to location of the each pixel in the complementary set of pixels. Pixels with adjacent information of same familiar degree may be put in the same category. Subsequently, for the complementary set of pixels in each category, interpolate to all the reconstructed pixel values including reconstruction value of the principal set of pixels, reconstruction value of reconstructed complementary set of pixels and reconstructed pixel values of other pixel block, to obtain the predictive value. And then, execute the intra-frame predictive encoding of hierarchical structure.

Specifically, the complementary set of pixels may utilize all the reconstructed pixel values, particularly the reconstruction value of the principal set of pixels, to execute the prediction. The complementary set of pixels may further be categorized, according to size of the complementary set of pixels, particularly when the size of the complementary set of pixels is much larger than that of the principal set of pixels (e.g., size of the complementary set of pixels is 10 times of that about the principal set of pixels). And then, the complementary set of pixels may be predicted with hierarchical structure. The complementary set of pixels is mainly categorized, according to location of the complementary set of pixels. Familiar degree of pixel adjacent information may be determined by pixel location. The complementary set of pixels with adjacent information of same familiar degree may be put in the same category. Pixels in the same category may employ a unified prediction mode. Complementary sets of pixels in different categories may employ different prediction modes. When the complementary set of pixels executes prediction encoding with the hierarchical structure, the lowest-level prediction (that is, prediction about latter encoded pixels) may utilize encoding result of high-level prediction (that is, prediction about previously encoded pixels). Lower-level prediction may possess higher accuracy. Thus, in subsequent quantization process, pixels in different categories may select different quantization accuracies, according to prediction accuracy. Prediction residual data of higher-level may employ higher quantization accuracy.

In specific implementations, predictive value of the complementary set of pixels is mainly obtained by interpolating to the reconstructed pixel values with an interpolation filter. For the prediction with the hierarchical structure, various filters may be designed according to the complementary set of pixels in each layer. There may be multiple filter designs. It may directly copy the reconstructed adjacent pixel values, or utilize the 6 tap filter of H.264/AVC. It may also design filters of other types. Various filters may be utilized to interpolate respectively, and select an optimal prediction result therein.

Block 104: combine the reconstruction value of the principal set of pixels and the reconstruction value of the complementary set of pixels, to obtain the reconstruction value of the pixel block Here, recombine the reconstruction value of the principal set of pixels obtained in block 102 and the reconstruction value of the complementary set of pixels obtained in block 103, to obtain the reconstruction value of the original block. The combination mode is an inverse process of the sampling mode in block 101.

In the foregoing, the encoding implementation process in the implementation mode of the invention is described in detail.

In the following, the encoding process in the implementation mode of the invention is described, in which I frame luminance component encoding of a video image is taken as an example.

Figure 5:
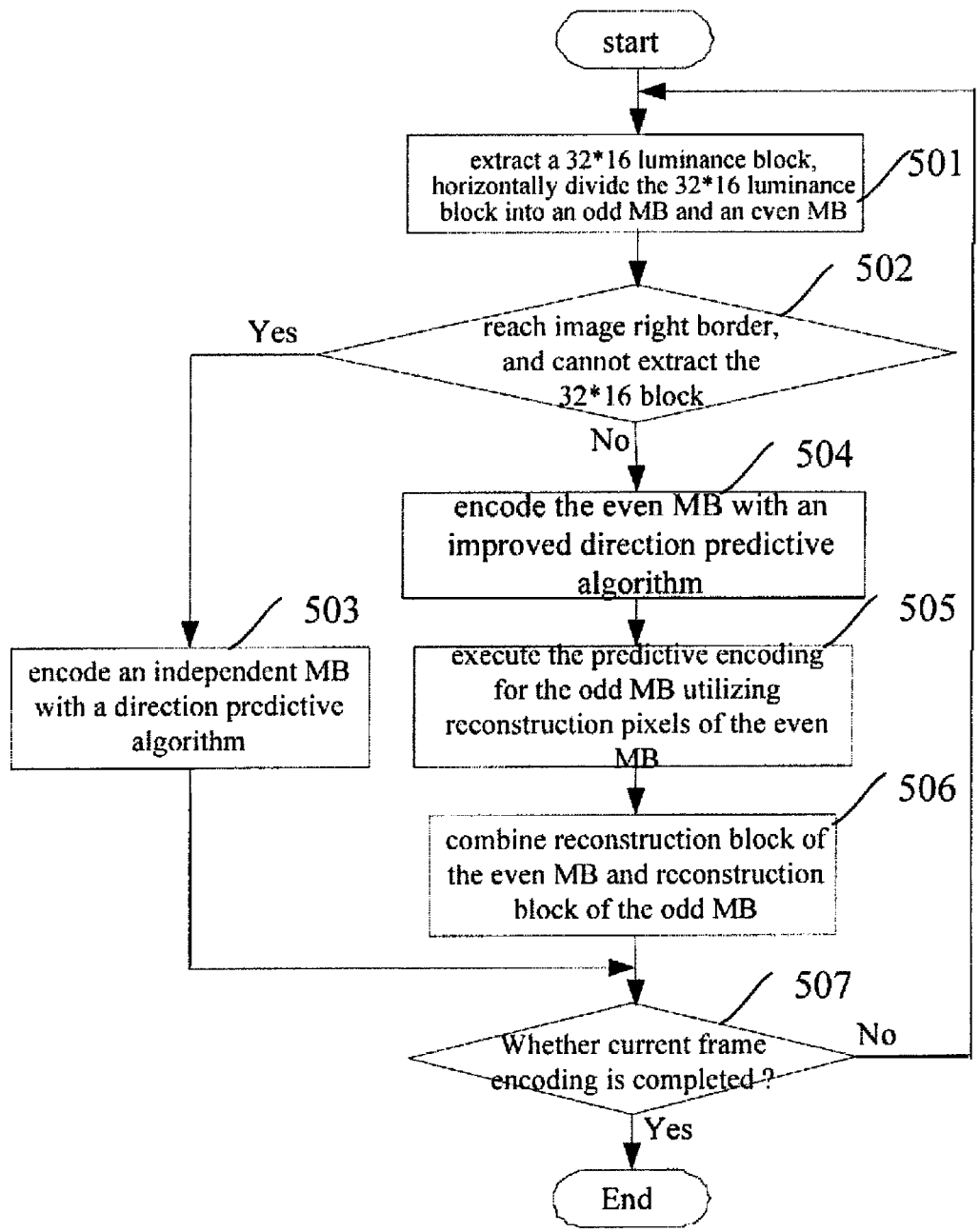
FIG. 5 is a flowchart illustrating a method for encoding an I frame luminance component, in accordance with an embodiment of the invention.

FIG. 5 is a flowchart illustrating a method for encoding I frame luminance component, in accordance with an embodiment of the invention. In the embodiment, implementation process of the invention is described, by taking a 32*16 luminance block, the width and height thereof are respectively 32 and 16 (32 corresponds to foregoing M, 16 corresponds to foregoing N). Persons having ordinary skill in the art may learn that, the descriptions taking 32*16 luminance block as an example are only illustrative, which are not used for limiting the implementation scope of the invention.

As shown in FIG. 5, the method includes the follows.

Block 501, extract a 32*16 luminance block from location of current encoding frame (corresponding to two consecutive natural MBs in the horizontal direction), and execute horizontal division for the 32*16 luminance block. Even-numbered columns therein may form an even MB. Odd-numbered columns therein may form an odd MB corresponding to the even MB.

Figure 6:
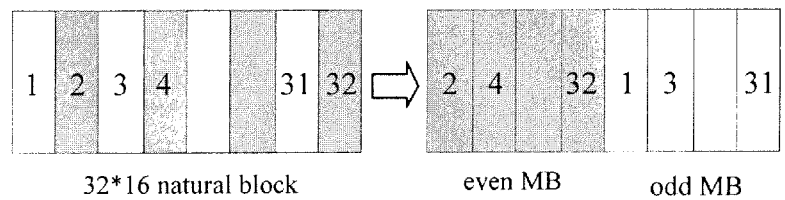
FIG. 6 is a schematic diagram illustrating how to divide an MB, in accordance with an embodiment of the invention.

More specifically, extract even-numbered columns of the 32*16 luminance block (columns with number 2, 4, 6, ..., 16) to form the even MB. Extract the odd-numbered columns of the 32*16 luminance block (columns with number 1, 3, 5, ..., 15) to form the odd MB. The specific schematic diagram is shown in FIG. 6.

Block 502, determine whether current encoding location achieves the right border MB of the frame, as well as determine whether there is only a single MB and the 32*16 luminance block cannot be extracted, if yes, proceed with block 503; otherwise, proceed with block 504.

Block 503, encode the single MB with the direction prediction algorithm, and proceed with block 507. Specifically, for the single MB at the right border, execute the prediction with the direction prediction algorithm, execute transformation, quantization and entropy encoding for the prediction residual, so as to output code stream of the block, meanwhile execute inverse quantization and inverse transformation for quantization coefficient to obtain a reconstruction block of the block.

Block 504, execute prediction for the even MB with the direction prediction algorithm, execute transformation, quantization and entropy encoding for the prediction residual to output the code stream of the block, meanwhile execute the inverse quantization and inverse transformation for the quantization coefficient to obtain the reconstruction block of the block.

More specifically, the even MB still needs to execute mode decision for the 4 kinds of prediction modes (that is, horizontal prediction, vertical prediction, DC prediction and planar prediction) about I16 MB (type of MB in charge of executing the intra-frame prediction for the whole 16*16 MB), and the 9 kinds of prediction modes (that is, vertical prediction (mode number 0), horizontal prediction (mode number 1), diagonal left down prediction (mode number 3), diagonal right down prediction (mode number 4), vertical right prediction (mode number 5), horizontal down prediction (mode number 6), vertical left prediction (mode number 7), horizontal left prediction (mode number 8) and DC prediction (mode number 2)) about I4 MB (type of MB in charge of executing the intra-frame prediction respectively for 16 4*4 blocks, which are obtained by dividing the 16*16 MB), so as to select the optimal prediction mode with encoding calculation. When current even MB is taken as a 16*16 block to be predicted, the prediction method and location of inputted pixels are consistent with that in a method for predicting a 16*16 luminance block by adopting the direction prediction algorithm in the prior art. When current MB is divided as 16 4*4 block to be predicted, although there are still 9 kinds of prediction modes, location of pixel used to be predicted may be changed. As shown in FIG. 6, gray dots represent pixels forming an even MB, and white dots represent pixels forming an odd MB. Gray dots in the rectangular box may form the 4*4 block currently encoded, and pixels used to be predicted are A-M. Pixels A-D come from a top adjacent even MB of current MB. Pixels I-M come from a left adjacent even MB of current MB, which are consistent with selection of prediction pixels, when executing prediction for a 4*4 luminance block with the direction prediction algorithm in the prior art. However, locations of pixels E-H may be changed. Pixels E-H may come from the nearest natural MB at the top right of current MB.

Block 505, predict the odd MB with the reconstruction pixels of the even MB, here, utilize the 6 tap filter of H.264/AVC to interpolate to the reconstructed even MB, and obtain the predictive value of the odd MB. Execute transformation, quantization and entropy encoding for the prediction residual of the odd MB, so as to output the code stream. Meanwhile, execute inverse quantization and inverse transformation for the quantization coefficient to obtain the reconstruction block of the block.

Figure 7:
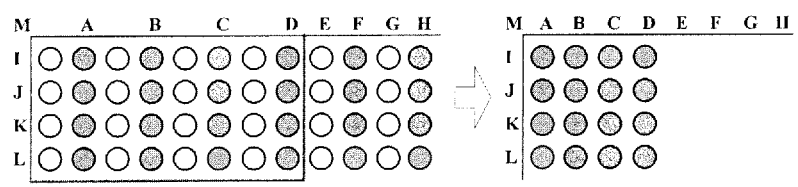
FIG. 7 is a schematic diagram illustrating how to select a 4*4 luminance block prediction pixel, in accordance with an embodiment of the invention.
Figure 8:
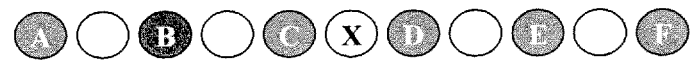
FIG. 8 is a schematic diagram illustrating a method for taking interpolation of an even MB as predictive value of an odd MB, in accordance with an embodiment of the invention.

More specifically, predict the odd MB by utilizing the reconstruction pixel block of the even MB. When the even MB is reconstructed, that is, left and right adjacent pixels of the odd MB are reconstructed. Here, the 6 tap interpolation filter may be utilized to interpolate to the reconstruction pixel values of the even MB, so as to obtain the predictive value of current odd MB. As shown in FIG. 7, gray dots represent the reconstructed pixels in the even MB, and the white dots represent pixels to be encoded in current odd MB.

For a pixel X to be encoded in current odd MB, the predictive value thereof may be represented by X in advance. Employ the following formula (2) to interpolate to the reconstruction values of reconstructed pixels A, B, C, D, E and F at left or right of pixel X, take the result as predictive value $X_{Prediction}$ of pixel X to be encoded in current odd MB.

$$X_{Prediction} = \text{round}((A_{reconstruction} - 5B_{reconstruction} + 20C_{reconstruction} + 20D_{reconstruction} - 5E_{reconstruction} + F_{reconstruction})/32) \quad \text{formula (2)}.$$

The round therein is a function, which indicates to round towards nearest integer.

$C_{reconstruction}$ is a reconstruction value of a reconstructed pixel C nearest to the left of pixel X.

$B_{reconstruction}$ is a reconstruction value of a reconstructed pixel B next-nearest to the left of pixel X.

$A_{reconstruction}$ is a reconstruction value of a reconstructed pixel A third-nearest to the left of pixel X.

$D_{reconstruction}$ is a reconstruction value of a reconstructed pixel D nearest to the right of pixel X.

$E_{reconstruction}$ is a reconstruction value of a reconstructed pixel E next-nearest to the right of pixel X.

$F_{reconstruction}$ is a reconstruction value of a reconstructed pixel F third-nearest to the right of pixel X.

In block 505, each pixel of the odd MB may be predicted independently with its adjacent pixels, which fully utilizes horizontal correlation among pixels. The prediction result thereof is more accurate than that of the direction prediction. Particularly to a block with complicated texture, prediction result of such prediction mode may be greatly improved, which may also directly improve encoding performance. Another advantage may also be generated by adopting block 505. That is, compared with H.264/AVC, by adopting the intra-frame encoding method in the implementation mode of the invention, time complexity may be significantly reduced. Due to the application of block 505, in an I frame currently encoded, there may be half or almost half pixels are predicted with the simple and unified 6 tap interpolation filter. It is not necessary to execute mode decision with higher complexity, which greatly reduces calculation complexity.

Figure 9:
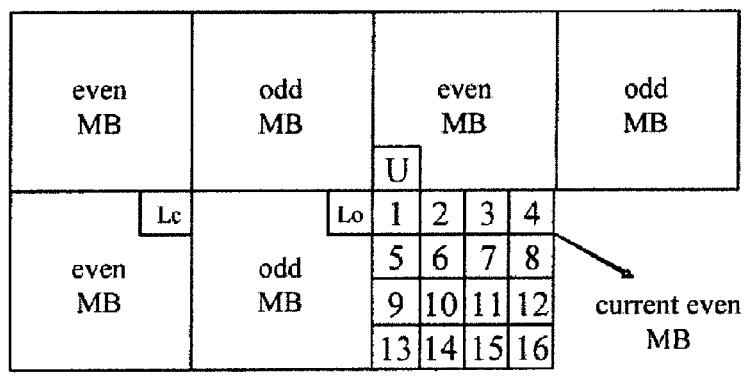
FIG. 9 is a schematic diagram illustrating a method for predicting an even MB with an intra-frame prediction mode, in accordance with an embodiment of the invention.

In the prior art, in the video encoding standards of H.264/AVC, for an MB encoded with I4 MB type, it is necessary to record prediction mode of each 4*4 block. To save these code stream overheads, it needs to predict these prediction modes. Due to the application of block 505, no matter which MB type is adopted (I4 MB or I16 MB) by an odd MB, there may be only one fixed prediction mode for the odd MB. Thus, it is not necessary to record in the code stream. For an even MB, when employing the I4 MB MB type, it still needs to record prediction mode for each 4*4 block. To more accurately predict the prediction mode of an even MB with I4 MB type, location of a block to be predicted may be changed. As shown in FIG. 9, in the conventional intra-frame encoding, utilize prediction modes of blocks U and Lo to predict the prediction mode of current block (number is 1). However, the application of block 505 may enable the left adjacent MB of current even MB to become an odd MB employing a fixed prediction mode. Therefore, here predict the prediction mode of current block (number is 1), by employing prediction modes of blocks Le and U in an even MB which is nearest to the left of current even MB. Similar situations exist for blocks with numbers 5, 9, 13 in current even MB, and blocks at left border of other even blocks.

Block 506, combine a reconstruction block of the even MB obtained in block 504 and a reconstruction block of the odd MB obtained in block 505, obtain reconstruction block of the original 32*16 luminance block. Each column of the even MB corresponds to even-numbered columns of the 32*16 block. Each column of the odd MB corresponds to odd-numbered columns of the 32*16 block.

Block 507, determine whether encoding of current frame is completed. When the encoding is completed, terminate the process; otherwise, jump to block 501 to continuously encode the next luminance block.

Based on foregoing detailed descriptions, an implementation mode of the invention also provides a device for video predictive encoding.

Figure 10:
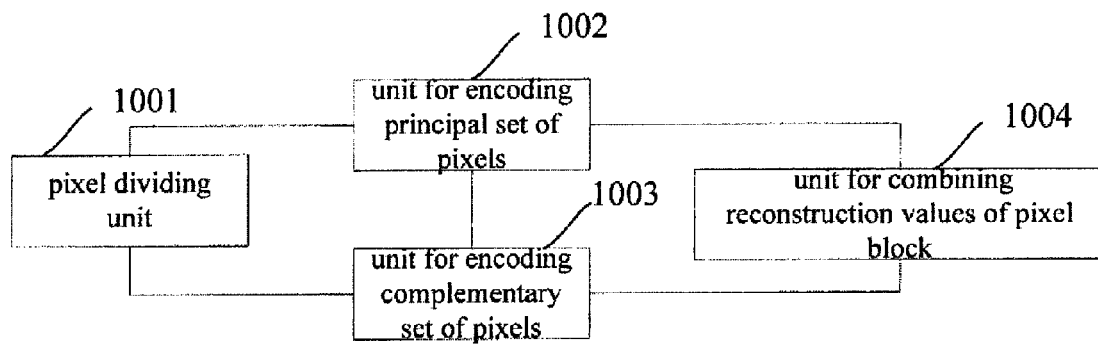
FIG. 10 is a schematic diagram illustrating an overall framework structure of a video predictive encoding device, in accordance with an embodiment of the invention.

FIG. 10 is a schematic diagram illustrating an overall framework structure of a video predictive encoding device, in accordance with an embodiment of the invention.

As shown in FIG. 10, the device includes a pixel dividing unit 1001, a unit for encoding a principal set of pixels 1002, a unit for encoding a complementary set of pixels 1003 and a unit for combining reconstruction value of pixel block 1004.

The pixel dividing unit 1001 is to extract a pixel block from current frame, and divide the pixel block into a principal set of pixels and a complementary set of pixels.

The unit for encoding a principal set of pixels is to encode the principal set of pixels, output code stream of the principal set of pixels, and obtain reconstruction value of the principal set of pixels.

The unit for encoding a complementary set of pixels 1003 is to, interpolate to reconstructed pixel values, which include a reconstruction value of the principal set of pixels, take the result as predictive value of the complementary set of pixels, and execute an intra-frame prediction encoding for the complementary set of pixels, output code stream of the complementary set of pixels, and obtain reconstruction value of the complementary set of pixels.

The unit for combining reconstruction value of pixel block 1004 is to, combine the reconstruction value of the principal set of pixels and the reconstruction value of the complementary set of pixels, according to a mode corresponding to pixel division, and obtain the reconstruction value of the pixel block.

In an implementation mode, the unit for encoding a principal set of pixels 1002 is to determine type of current frame. When type of current frame is I frame, the unit for encoding a principal set of pixels 1002 may employ H.264/AVC direction prediction algorithm to encode. When type of current frame is P frame or B frame, the unit for encoding a principal set of pixels 1002 may employ an algorithm similar to the H.264/AVC direction prediction algorithm, or employ an inter-frame motion search algorithm to encode.

In an implementation mode, the unit for encoding a complementary set of pixels 1003 is to, categorize each pixel in the complementary set of pixels, according to location of the each pixel in the complementary set of pixels, put pixels with adjacent information of same familiar degree into the same category, for the complementary set of pixels in each category, utilize the interpolation filter to respectively interpolate to all the reconstruction pixel values, which include the reconstruction value of the principal set of pixels, reconstruction value of the reconstructed complementary set of pixels, and reconstructed pixel value of other pixel block, to obtain the predictive value, and then execute the intra-frame predictive encoding of hierarchical structure.

The interpolation filter included in the unit for encoding a complementary set of pixels 1003 may be the 6 tap filter of H.264/AVC, or other filters. When employing the 6 tap interpolation filter, the 6 tap interpolation filter may be used to interpolate to the reconstructed pixels, and take the result as predictive value of the complementary set of pixels in each category.

Figure 11:
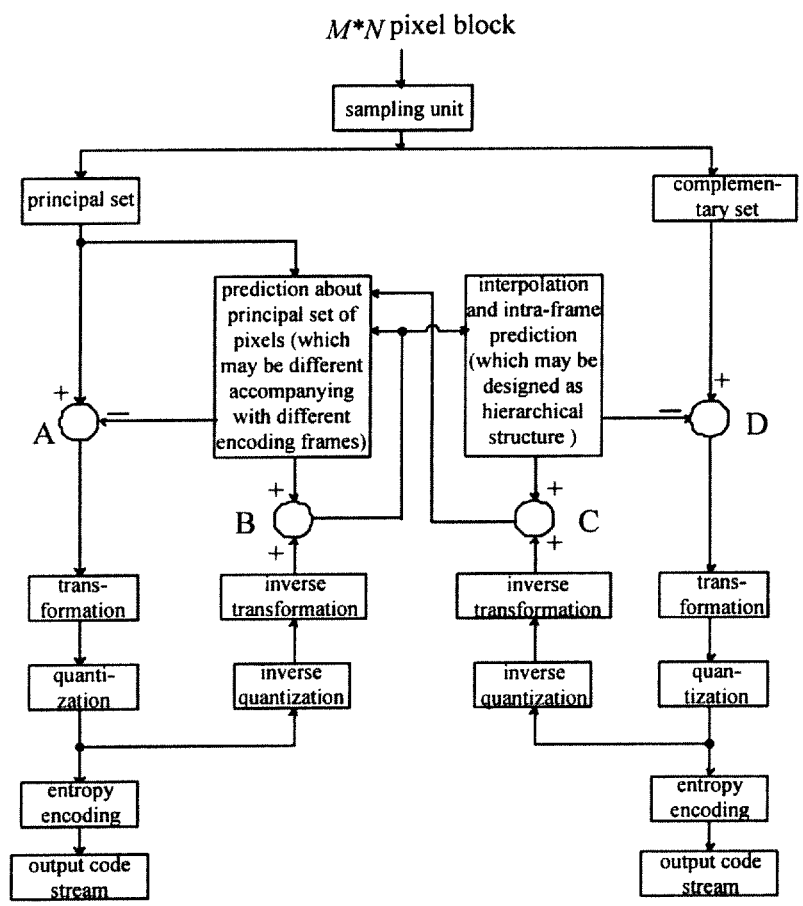
FIG. 11 is a schematic diagram illustrating structure of a video predictive encoding device, in accordance with an embodiment of the invention.

FIG. 11 is a schematic diagram illustrating structure of a video predictive encoding device, in accordance with an embodiment of the invention. In FIG. 11, the device is to execute predictive encoding for an M*N pixel block.

As shown in FIG. 11, the device includes a sampling unit, which is to extract an M*N block from currently encoded frame, and extract some pixels from the block to from a principal set of pixels, according to a certain sampling rule. The remaining pixels may be recorded as the complementary set of pixels.

Based on different type of current frame, the principal set of pixels may predict with a prediction mode suitable for the frame type, and execute transformation, quantization and entropy encoding for the prediction residual, so as to output code stream of the principal set of pixels, meanwhile execute the inverse quantization and inverse transformation for the quantization coefficient, add the predictive value of the principal set of pixels to the result to obtain the reconstruction value of the principal set of pixels.

For the complementary set of pixels, firstly interpolate to reconstructed pixel values, which include reconstruction value of the principal set of pixels, take the result as the predictive value of the complementary set of pixels, execute transformation, quantization and entropy encoding for the prediction residual, so as to output code stream of the complementary set of pixels, meanwhile execute the inverse quantization and inverse transformation for the quantization coefficient, add the predictive value of the complementary set of pixels to the result to obtain the reconstruction value of the complementary set of pixels.

Finally, combine the reconstruction value of the principal set of pixels and the reconstruction value of the complementary set of pixels, with a mode corresponding to pixel division, to obtain the reconstruction value of the pixel block. As shown in FIG. 11, circle represents sum of two data streams, plus sign represents that the data stream is positive, and minus sign represents that the data stream is negative.

A more detailed description for FIG. 11 is provided in the following. Firstly, the sampling unit extracts an M*N block from currently encoded frame, and extract some pixels from the block to form the principal set of pixels, according to a certain sampling rule. The remaining pixels may be recorded as the complementary set of pixels.

Based on different type of current frame, the principal set of pixels may predict with a prediction mode suitable for frame type. At node A, subtract the predictive value of the principal set of pixels from an original value of the principal set of pixels, to obtain the prediction residual of the principal set of pixels. And then, calculate downwards in sequence from node A, execute transformation, quantization and entropy encoding for the prediction residual of the principal set of pixels, so as to output code stream of the principal set of pixels. In the calculation downwards from node A, the prediction residual coefficient after transformation and quantization still needs to be processed with inverse quantization and inverse transformation in sequence, to obtain a difference value. Add the difference value to the predictive value of the principal set of pixels at node B, and obtain the reconstruction value of the principal set of pixels.

Similarly, for the complementary set of pixels, firstly interpolate to reconstructed pixel values, which include the reconstruction value of the principal set of pixels, take the result as predictive value of the complementary set of pixels. And then, subtract the predictive value of the complementary set of pixels from the original value of the complementary set of pixels at node D, and obtain the prediction residual of the complementary set of pixels. And then, execute transformation, quantization and entropy encoding in sequence for the predictive value of the complementary set of pixels, and output code stream of the complementary set of pixels. In the calculation downwards from node D, the prediction residual coefficient after transformation and quantization still needs to be processed with inverse quantization and inverse transformation in sequence, to obtain a difference value. And then, add the difference value to predictive value of the complementary set of pixels at node C, to obtain the reconstruction value of the complementary set of pixels.

As described in the example illustrated in FIG. 5, for each I frame, after adopting the implementation mode of the invention, since half (or almost half) pixels may employ a simple, fixed and effective interpolation filter algorithm to predict, the horizontal correlation among intra-frame pixels is fully utilized, prediction accuracy is improved and prediction residual is reduced. Thus, residual code stream overhead may be directly reduced, and compression efficiency may be improved.

At the same time, by adopting the implementation mode of the invention, code stream overhead of flag information about intra-frame prediction mode may be reduced, which is another reason for improving the compression efficiency. For an odd MB, the fixed prediction mode may save code stream overhead of flag information about prediction mode. For an even MB, a prediction encoding method of an improved intra-frame prediction mode may enable larger limit savings of code stream overhead of flag information about the intra-frame prediction mode.

Besides, in the intra-frame encoding scheme provided by the example describing implementation mode of the invention, for an odd MB, utilize the reconstruction pixel block of an encoded even MB, as well as employ a simple unified 6 tap interpolation filter to execute the predictive encoding. Thus, in the currently encoded I frame, it is not necessary to execute mode decision calculation with higher complexity for almost half or half pixels therein. Therefore, compared with the intra-frame prediction algorithm of H.264/AVC, the calculation complexity may be significantly reduced.

In addition, implementation complexity of technical scheme provided by embodiments of the invention is lower. When utilizing the reconstruction pixel block of an encoded even MB to execute predictive encoding for an odd MB, calculation of the 6 tap interpolation filter may only utilize 19*16 pixel, in which 16*16 pixel comes from pixels belonging to an even MB in current 32*16 block, 3*16 pixel comes from a left reconstructed neighbor MB. It is not necessary to buffer MBs of other rows in the encoding process. Thus, memory occupation is significantly saved, cache hit rate may be improved. Particularly to a high-definition video source with huge data amount, the scheme with low memory occupation is easily implemented with chip.

Furthermore, the technical solution provided by embodiments of the invention is suitable for implementing highly parallel calculation. Thus, rapid encoding compression of the high-definition video source may be implemented.

Apply the method provided by an implementation mode of the invention to a basic level of the H.264/AVC standards. Reference software may employ reference software JM15.0 of the H.264/AVC standards. For a sequence with resolution 720 p, a peak signal-to-noise ratio (PSNR) gain, the average thereof is 0.39 dB, or 7.31% bit rate saving may be achieved.

Figure 12:
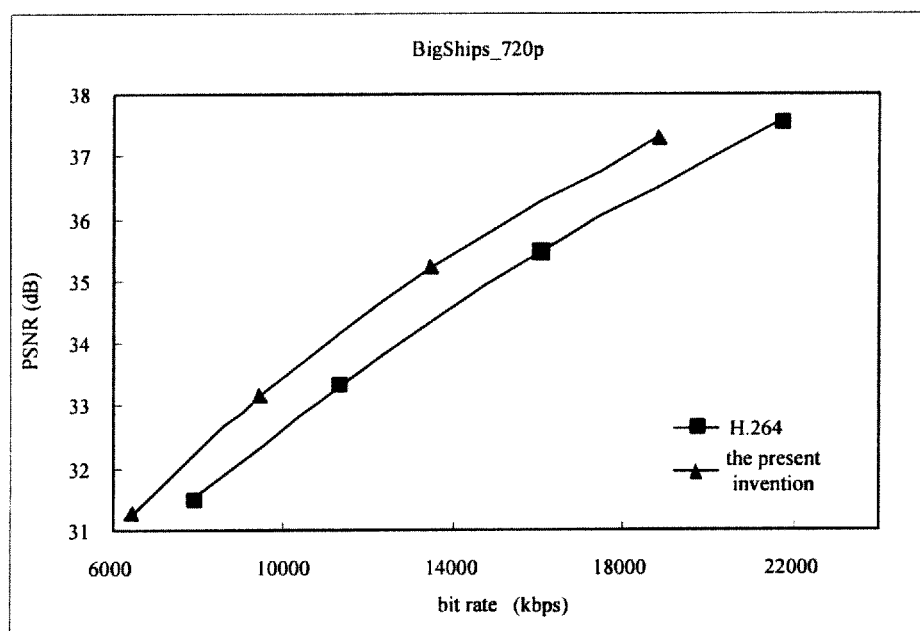
FIG. 12 is a curve comparison chart about rate distortion of BigShips sequence, in accordance with an embodiment of the invention.

FIG. 12 is a curve comparison chart about rate distortion of BigShips sequence, in accordance with an embodiment of the invention. FIG. 12 provides rate distortion curve comparison of BigShips sequence, the resolution and frame rate thereof are respectively 720 p and 30 fps. The curve above the graph is rate distortion curve of the BigShips sequence with 720 p resolution and 30 fps frame rate, by adopting the implementation mode of the invention. The curve below the graph is a rate distortion curve of the BigShips sequence with 720 p resolution and 30 fps frame rate, by adopting the H.264. For the sequence, 0.79 dB PSNR gain or 15% bit rate saving may be achieved, by adopting the implementation mode of the invention.

The foregoing is only preferred embodiments of the invention, which is not used for limiting the invention. Any modifications, equivalent substitutions and improvements made within the spirit and principal of the invention, should be covered by protection scope of implementation modes of the invention.

The invention claimed is:

1. A method for video predictive encoding, comprising:
    extracting a pixel block from current frame, dividing the pixel block into a principal set of pixels and a complementary set of pixels;
    encoding the principal set of pixels, outputting code stream of the principal set of pixels, obtaining a reconstruction value of the principal set of pixels;
    interpolating to reconstructed pixel values, which comprise the reconstruction value of the principal set of pixels, take a result as predictive value of the complementary set of pixels, executing an intra-frame predictive encoding for the complementary set of pixels, outputting code stream of the complementary set of pixels, obtaining a reconstruction value of the complementary set of pixels; and
    combining the reconstruction value of the principal set of pixels and the reconstruction value of the complementary set of pixels, and obtaining a reconstruction value of the pixel block;
    wherein encoding the principal set of pixels comprises:
    determining type of current frame, when current frame is an I frame, employing an H.264 or an Advanced Video Coding (AVC) direction prediction algorithm to encode the principal set of pixels, when current frame is a P frame or B frame, employing the H.264 or AVC direction prediction algorithm, or employing an inter-frame motion search algorithm to encode the principal set of pixels.

2. The method according to claim 1, wherein the reconstructed pixel values are the reconstruction value of the principal set of pixels.

3. The method according to claim 1, wherein the reconstructed pixel values comprise the reconstruction value of the principal set of pixels, and reconstruction value of other pixel block except for the pixel block.

4. The method according to claim 1, wherein interpolating to the reconstructed pixel values, which comprise the reconstruction value of the principal set of pixels, take the result as the predictive value of the complementary set of pixels, and executing the intra-frame predictive encoding for the complementary set of pixels comprise:
    categorizing each pixel in the complementary set of pixels, according to location of the each pixel in the complementary set of pixels, putting pixels with adjacent information of same familiar degree into one category;
    for the complementary set of pixels in each category, respectively interpolating to all the reconstructed pixel values, which comprise the reconstruction value of the principal set of pixels, the reconstruction value of the reconstructed complementary set of pixels and reconstructed pixel value of other pixel block, obtaining the predictive value, and executing the intra-frame predictive encoding of hierarchical structure.

5. The method according to claim 4, wherein interpolating to all the reconstructed pixel values, which comprise the reconstruction value of the principal set of pixels, the reconstruction value of the reconstructed complementary set of pixels and the reconstructed pixel value of other pixel block, obtaining the predictive value, and executing the intra-frame predictive encoding of hierarchical structure comprise:

utilizing a 6 tap filter of the H.264 or AVC to interpolate to all the reconstructed pixel values, taking the result as the predictive value of the complementary set of pixels in each category.

6. The method according to claim 5, wherein the principal set of pixels is an even Macro Block (MB), the complementary set of pixels is an odd MB, for any pixel X of the odd MB, predictive value XPrediction is:

$$X_{Prediction} = \text{round}((A_{reconstruction} - 5B_{reconstruction} + 20C_{reconstruction} + 20D_{reconstruction} - 5E_{reconstruction} + F_{reconstruction})/32);$$

wherein the round is a function, which indicates to round towards nearest integer;

the $C_{reconstruction}$ is a reconstruction value of a reconstructed pixel C nearest to left of the pixel X;

the $B_{reconstruction}$ is a reconstruction value of a reconstructed pixel B next-nearest to the left of the pixel X;

the $A_{reconstruction}$ is a reconstruction value of a reconstructed pixel A third-nearest to the left of the pixel X;

the $D_{reconstruction}$ is a reconstruction value of a reconstructed pixel D nearest to right of the pixel X;

the $E_{reconstruction}$ is a reconstruction value of a reconstructed pixel E next-nearest to the right of the pixel X; and the $F_{reconstruction}$ is a reconstruction value of a reconstructed pixel F third-nearest to the right of the pixel X.

7. The method according to claim 1, wherein extracting the pixel block from current frame, dividing the pixel block into the principal set of pixels and the complementary set of pixels comprise:

dividing the pixel block into the principal set of pixels and the complementary set of pixels, according to the sampling mode of every other row and every other column;

wherein width and height of the principal set of pixels are respectively m, n, m and n comply with the following formula, $$m = \left\lfloor \frac{M-c}{T_c} \right\rfloor + 1, n = \left\lfloor \frac{N-r}{T_r} \right\rfloor + 1;$$

function $\lfloor \ \rfloor$ indicates to round towards minus infinity;

M and N are respectively width and height of the pixel block;

$T_c$ is a column sampling period, $T_r$ is a row sampling period, $T_r$ is a non-zero integer, $T_r \leq N$; $T_c$ is a non-zero integer, $T_c \leq M$, $T_r \cdot T_c \neq 1$;

r is a row number indicating first line of the principal set of pixels in the pixel block, r=1, ..., $T_r$; c is a column number indicating first column of the principal set of pixels in the pixel block, c=1, ..., $T_c$.

8. The method according to claim 1, wherein the pixel block is a luminance block or a chrominance block.

9. The method according to claim 1, wherein dividing the pixel block into the principal set of pixels and the complementary set of pixels comprises:

dividing the pixel block into the principal set of pixels and the complementary set of pixels, according to a sampling mode of every other row and every other column, a board sampling mode, or a class board sampling mode.

10. A device for video predictive encoding, wherein the device comprises a pixel dividing unit, a unit for encoding a principal set of pixels, a unit for encoding a complementary set of pixels, and a unit for combining reconstruction value of pixel block;

the pixel dividing unit is to extract a pixel block from current frame, divide the pixel block into a principal set of pixels and a complementary set of pixels;

the unit for encoding a principal set of pixels is to encode the principal set of pixels, output code stream of the principal set of pixels, and obtain a reconstruction value of the principal set of pixels;

the unit for encoding a complementary set of pixels is to interpolate to reconstructed pixel values, which comprise the reconstruction value of the principal set of pixels, take a result as predictive value of the complementary set of pixels, execute an intra-frame predictive encoding for the complementary set of pixels, output code stream of the complementary set of pixels, and obtain a reconstruction value of the complementary set of pixels; and the unit for combining reconstruction value of pixel block is to, combine the reconstruction value of the principal set of pixels and the reconstruction value of the complementary set of pixels, and obtain a reconstruction value of the pixel block;

wherein the unit for encoding a principal set of pixels is to determine type of current frame, when current frame is an I frame, employ an H.264 or an Advanced Video Coding (AVC) direction prediction algorithm to encode; when current frame is a P frame or B frame, employ the H.264 or AVC direction prediction algorithm or an inter-frame motion search algorithm to encode.

11. The device according to claim 10, wherein the unit for encoding a complementary set of pixels is to categorize each pixel in the complementary set of pixels, according to location of the each pixel in the complementary set of pixels, put pixels with adjacent information of same familiar degree into one category, for the complementary set of pixels in each category, interpolate to all the reconstructed pixel values, which comprise the reconstruction value of the principal set of pixels, reconstruction value of the reconstructed complementary set of pixels, and reconstructed pixel value of other pixel block, obtain a predictive value, and execute an intra-frame predictive encoding of hierarchical structure.

12. The device according to claim 10, wherein the unit for encoding a complementary set of pixels comprises a 6 tap filter of the H.264 or AVC, which is to interpolate to all the reconstructed pixel values and take the result as predictive value of the complementary set of pixel in each category.

13. The device according to claim 12, wherein the principal set of pixels is an even Macro Block (MB), the complementary set of pixels is an odd MB;

for any pixel X of the odd MB, predictive value $X_{Prediction}$ is:

$$X_{Prediction} = \text{round}((A_{reconstruction} - 5B_{reconstruction} + 20C_{reconstruction} + 20D_{reconstruction} - 5E_{reconstruction} + F_{reconstruction})/32);$$

the round is a function, which indicates to round towards nearest integer;

the $C_{reconstruction}$ is a reconstruction value of a reconstructed pixel C nearest to left of the pixel X;

the $B_{reconstruction}$ is a reconstruction value of a reconstructed pixel B next-nearest to the left of the pixel X;

the $A_{reconstruction}$ is a reconstruction value of a reconstructed pixel A third-nearest to the left of the pixel X;

the $D_{reconstruction}$ is a reconstruction value of a reconstructed pixel D nearest to right of the pixel X;

the $E_{reconstruction}$ is a reconstruction value of a reconstructed pixel E next-nearest to the right of the pixel X; and the $F_{reconstruction}$ is a reconstruction value of a reconstructed pixel F third-nearest to the right of the pixel X.

14. The device according to claim 10, wherein the pixel dividing unit is to divide the pixel block into the principal set of pixels and the complementary set of pixel, according to a sampling mode of every other row and every other column, width and height of the principal set of pixels are respectively m and n, m and n comply with the following formula, $$m = \left\lfloor \frac{M-c}{T_c} \right\rfloor + 1, n = \left\lfloor \frac{N-r}{T_r} \right\rfloor + 1;$$

function $\lfloor \ \rfloor$ indicates to round towards minus infinity;

M and N are respectively width and height of the pixel block;

$T_c$ is a column sampling period, $T_r$ is a row sampling period, $T_r$ is a non-zero integer, $T_r \leq N$; $T_c$ is a non-zero integer, $T_c \leq M$, $T_r \cdot T_c \neq 1$;

r is a row number indicating first line of the principal set of pixels in the pixel block, r=1, ..., $T_r$; c is a column number indicating first column of the principal set of pixels in the pixel block, c=1, ..., $T_c$.

15. The device according to claim 10, wherein the pixel dividing unit is to divide the pixel block into the principal set of pixels and the complementary set of pixels, according to a sampling mode of every other row and every other column or a board sampling mode.

* * * * *